United States Patent [19]

Stevenson

[11] Patent Number: 4,557,403
[45] Date of Patent: Dec. 10, 1985

[54] DRY FEEDER FOR FINELY DIVIDED SOLIDS INTO HIGH PRESSURE ATMOSPHERE

[75] Inventor: John S. Stevenson, Los Angeles, Calif.

[73] Assignee: Texaco Inc., White Plains, N.Y.

[21] Appl. No.: 600,275

[22] Filed: Apr. 13, 1984

[51] Int. Cl.⁴ ............................................. G01F 11/24
[52] U.S. Cl. .................................... 222/252; 222/362
[58] Field of Search .............. 222/363, 450, 630, 362, 222/252; 141/44

[56] References Cited

U.S. PATENT DOCUMENTS 3,190,509  6/1965  Kirchhoefer .......................... 222/450

Primary Examiner—Stanley H. Tollberg
Attorney, Agent, or Firm—Robert A. Kulason; James J. O'Loughlin; Henry C. Dearborn

[57] ABSTRACT

A feeder for finely divided solids from atmospheric pressure into a high pressure atmosphere. It has a chute to hold the solids at atmospheric pressure, and a valve with seals to deliver the solids into a loading chamber. There is an arrangement for pressurizing the loading chamber, and the chamber is oriented so that the solids will discharge through another valve by gravity flow into the high pressure atmosphere after pressurization of the chamber. There is also an arrangement for displacing the high pressure atmosphere from the chamber after discharge of the solids and before the next delivery of another charge from the chute.

10 Claims, 5 Drawing Figures

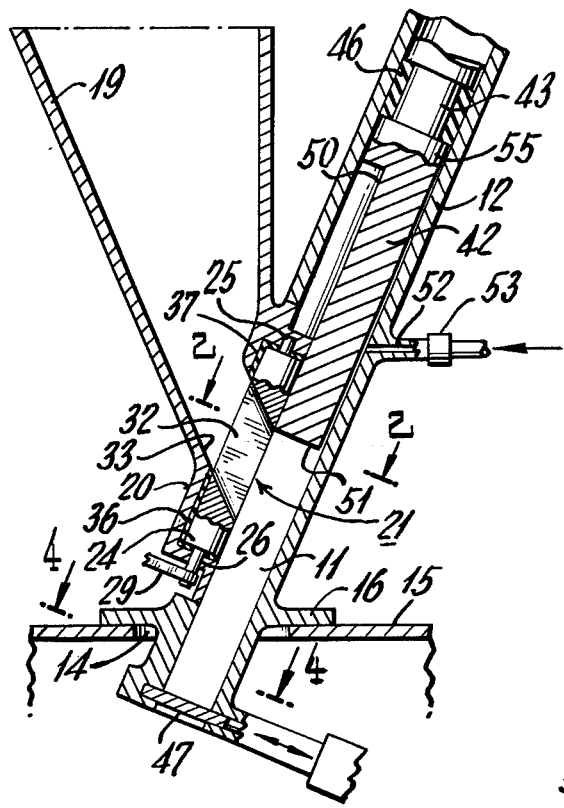
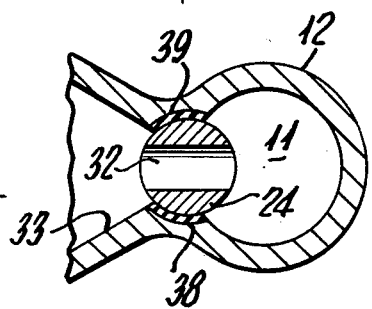
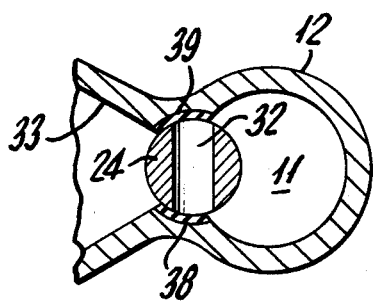
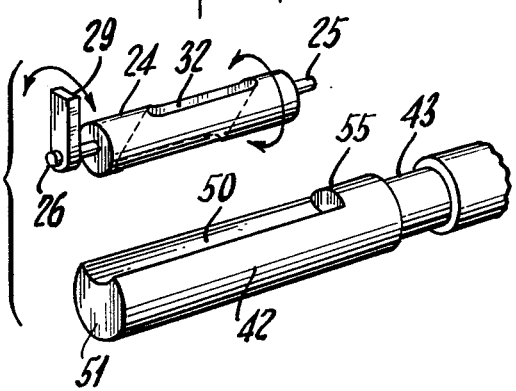
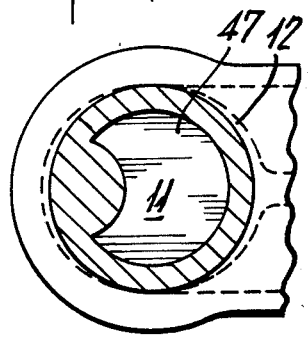

DRY FEEDER FOR FINELY DIVIDED SOLIDS INTO HIGH PRESSURE ATMOSPHERE

This invention concerns a dry feeder for finely divided solids, in general. More specifically it relates to a feeder of the nature indicated that can deliver finely divided solids from atmospheric pressure into a high pressure atmosphere.

BRIEF SUMMARY OF THE INVENTION

Briefly the invention may be described as a dry feeder for finely divided solids into a high pressure atmosphere. It comprises a load chamber and chute means for delivering said solids by gravity flow at atmospheric pressure to said load chamber. It also comprises first valve means for controlling said delivery including seal means to withstand said high pressure, and means for pressurizing said load chamber. It also comprises means for orienting said load chamber for permitting discharge by gravity flow into said high pressure atmosphere, and second valve means for controlling said gravity discharge. And, it comprises means for displacing said high pressure atmosphere from said load chamber after said gravity discharge.

Again briefly, the invention may be described as a dry feeder for powdered coal and the like, into a high pressure atmosphere. It comprises in combination a cylindrical chamber for holding a charge of said powdered coal, and means for mounting said chamber at an angle greater than the angle of repose of said charge, for biasing said charge toward one end of said chamber. It also comprises first valve means at said one end of said chamber to control discharge therefrom into said high pressure atmosphere, and a receptacle for holding a supply of said powdered coal. It also comprises means for connecting said receptacle with said chamber at an angle greater than the angle of repose of said powdered coal for permitting gravity feed from said receptacle to said chamber, and second valve means for controlling said gravity feed. It also comprises means for pressurizing said chamber to equalize said high pressure atmosphere, and means for displacing said high pressure atmosphere from said chamber after discharge of said powdered coal therefrom.

Once more briefly, the invention may be described as a dry feeder for powdered coal and a like into a high pressure atmosphere. It comprises in combination a cylindrical chamber for holding a charge of said powdered coal, and a means for mounting said chamber with its axis at an angle of about seventy degrees from horizontal for biasing said charge towards the lower end thereof. It also comprises first valve means at said lower end of said chamber to control discharge therefrom into said high pressure atmosphere, and a receptacle for holding a supply of said powdered coal. It also comprises means for connecting said receptacle with said chamber at an angle of about seventy degrees from horizontal for permitting gravity feed from said receptacle to said chamber, and second valve means comprising a solid cylinder mounted in the wall of said chamber with the axis of the cylinder parallel to the axis of the chamber. It also comprises a transverse slot through said cylinder with the axis of said slot at about forty degrees from the axis of said cylinder, and means for sealing said cylinder mounting for holding said high pressure when said cylinder is rotated ninety degrees. It also comprises means for pressurizing said chamber to equalize said high pressure atmosphere, and a piston reciprocally movable in said chamber for displacing said high pressure atmosphere from said chamber after discharge of said powdered coal. The said piston has a longitudinal groove thereon to accommodate said second valve means within said chamber.

Heretofore, there have been proposals for feeding solids into a high pressure atmosphere. For example there are U.S. Pat. No. 4,140,228 issued Feb. 20, 1979 and U.S. Pat. No. 4,150,759 issued Apr. 24, 1979, both assigned to the U.S. Department of Energy. However, the arrangements employed to those two patents both involve the use of double acting pistons, and the action requires the pushing of a charge of solids from one location to another in order to accomplish the discharge into a high pressure atmosphere. Such action tends to cause excessive wear of the parts, and this is avoided by the applicants invention.

Another prior structure is a commercial feeder that is called a "Dynamic Sleeve, Piston Type Coal Feeder". It is manufactured by Conspray Construction Systems, Inc. 111 West Dyer Road, Suite B, Santa Ana, Calif. 92707. The structure of that feeder also makes use of a pushing action to discharge the solids into the high pressure atmosphere. In addition, it requires a relatively complex mechanism which has a sleeve that surrounds a piston and includes a secondary piston inside the sleeve structure. On the other hand, the applicant's invention provides a relatively simple structural arrangement whereby the finely divided solids are charged by gravity feed and thereafter, following pressurization, are discharged also by gravity feed into the high pressure atmosphere. There is only a single piston arrangement, and its function is to displace the high pressure atmosphere remaining in the chamber following the discharge by gravity flow.

Consequently, it is an object of this invention to provide a dry feeder for finely divided solids that permits gravity flow charging of the solids followed by pressurizing and gravity flow discharge into a high pressure atmosphere.

Another object of the invention is to provide a relatively simplified structure which can in addition to making the charging and discharging action take place by gravity flow, provide for displacing the high pressure atmosphere following discharge in order to reduce the high pressure loss to a minimum.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic longitudinal cross section showing an assembly of the elements according to the invention;

FIG. 2 is an enlarged cross section view taken along the lines 2—2 of FIG. 1 and looking in the direction of the arrows;

FIG. 3 is another enlarged cross section view like FIG. 2, but which shows the valve in its closed position;

FIG. 4 is an enlarged cross section view taken along the lines 4—4 of FIG. 1 and looking in the direction of the arrows; and FIG. 5 is an exploded perspective showing the inlet valve cylinder along with the displacement piston of the FIG. 1 showing.

DETAILED DESCRIPTION

A dry feeder according to this invention has the advantage of providing gravity movement for the finely divided solids through the feeder, both to load, as well as to unload after the high pressure atmosphere has been connected. In order to accomplish the gravity discharge into the high pressure atmosphere, the chamber for holding a charge of the finely divided solids is oriented at an angle that is greater than the angle of repose of the fine solids. Thus, by having the load chamber set at an angle of approximately seventy degrees or more with the horizontal, the finely divided solids may discharge by gravity flow after the chamber has been pressurized to equalize with the high pressure atmosphere into which the solids are being discharged. Along with that benefit, the arrangement provides for a charging chute connection that has a cylindrical rotating valve so that each charge of the finely divided solids may flow into the chamber by gravity and thereafter have the inlet valve close using a rotating action which avoids any frictional slicing into the solids in the loading chamber.

Referring to the drawings, it will be observed that there is a cylindrical load chamber 11 to hold a charge of powdered coal (not shown) or the like. Chamber 11 is located at the lower end of a generally cylindrical structure 12 which is mounted on a horizontal upper wall 15 of a high pressure container. It will be understood that this wall 15 contains high pressure there beneath. It may be one wall of a manifold or the upper wall of a gasifier (not shown) or the like, and it has a hole 14 therein through which the lower end of the cylindrical structure 12 extends.

The structure 12 might take different configurations, but in the illustrated embodiment it has an integral flange 16 near the lower end. This flange 16 is for securely attaching the whole structure 12 to the high pressure wall 15. It is to be noted that whatever the container of a high pressure atmosphere may be, the axis of the chamber 11 is oriented at about seventy degrees or greater with the horizontal. In the illustration, the wall 15 of the high pressure containing element lies horizontally.

There is a chute 19 that is integrally connected with an outer cylindrical shaped surface 20 of a specially constructed valve 21. This valve 21 is made up of a cylinder 24 that is mounted for rotation on an axis which is parallel to the axis of the load chamber 11. Thus, the cylinder 24 rotates about its axles 25 and 26 and may be rotated through an angle of ninety degrees. Such rotation may be carried out by any feasible arrangement such as by means of an arm 29 that is securely attached near the end of the axle 26.

The valve 21 includes a lateral slot 32 through the cylinder 24. This slot 32 goes through the cylinder 24 at an angle in order to coincide and be in alignment with a lower opening 33 at the mouth of the chute 19. It will be observed that because the slot 32 is angled through the cylinder 24, when the valve 21 is open (as illustrated in FIG. 1) the slot 32 is in alignment with both the bottom of the chute 19 and the upper end of the chamber 11.

There are seals 36 and 37 that are supported by surrounding structure which includes the outer surface 20 that covers one end of the cylinder 24. There are also integral seals 38 and 39 which extend to and join together with the seals 36 and 37. These seals 38 and 39 lie along the sides of the structure that supports the central portion of the cylinder 24, in the manner illustrated in FIGS. 2 and 3. Thus, over the central portion of the cylinder 24 it has the connecting seals 38 and 39 which create the ability to seal the valve closed against the high pressure when it is in the position illustrated in FIG. 3.

There is a piston 42 that may move longitudinally i.e. axially within the structure 12 which has a cylindrical internal shape. The piston 42 has a reduced diameter section 43 to accommodate a seal 46 for holding the high pressure of the atmosphere internally of the wall 15 when the chamber 11 has been pressurized and/or when a valve 47 at the lower end of the chamber 11 is open. The piston 42 has a longitudinal groove 50 along the upper surface thereof. This accommodates the cylindrical shape of the cylinder 24 and its supporting structure.

There is an inlet passage 52 that goes through the wall of the structure 12 at a location that is down stream of the seal 46 on piston 42 when fully extended, but up stream of face 51 of the piston 42 when it is fully retracted. The retracted position is illustrated in FIG. 1. This inlet passage 52 is for introducing a pressurizing gas into the chamber 11 following a filling of the chamber by a charge from the chute 19 through the slot 32 of the valve 21. It will be appreciated that the valve 21 will be closed after such charge has filled the chamber 11 and before the pressurizing gas is introduced through the passage 52. It may be noted that there is a valve 53 to control the introduction of the pressurizing gas and to close the passage 52 after high pressure has been applied. Also, the inlet structure of the passage 52 i.e. where it connects into the interior of the structure 12 surrounding the piston 42, may have a dispersion ring (not shown) or the like for circumferentially dispersing the pressurizing gas around the piston 42.

It will be understood that the valve 47 which is schematically illustrated as a gate type valve, might take other forms e.g. a full port ball valve or other suitable type. Also, it will be understood that whatever form this valve takes it must be able to seal against the high pressure atmosphere internally of the wall 15 when the valve is closed.

OPERATION

A typical cycle of operation of the feeder is as follows. Starting with the valve 21 open and the other parts in the positions illustrated in FIG. 1, finally divided solids, e.g., powdered coal (not shown) will fall by gravity from the chute 19 down through the slot 32 in the cylinder 24 of the valve 21 until such solids fill the chamber 11. At this time, of course the chamber 11 is at atmospheric pressure.

Next, as soon as the chamber 11 has been filled by gravity flow (because of the angle of the chute 19 and the passage way through the slot 32), the valve 21 will be closed by rotating the cylinder 24 ninety degrees using the arm 29.

Then the valve 53 will be opened to admit gas under pressure to flow through the passage 52 and around the piston 42 into the chamber 11 until it is equal in pressure with the high pressure atmosphere inside of the wall 15. As soon as the pressure has been equalized, the valve 53 will be closed and then the valve 47 will be opened by withdrawing its gate.

Following the opening of valve 47, the powdered coal or other finely divided solids in the chamber 11 will fall out under gravity flow into the high pressure atmosphere beneath the wall 15. As before, this emptying action, or flow out of the chamber 11 takes place because of the angle that the axis of chamber 11 makes with the horizontal. It is such that it is greater than the angle of repose of the finely divided solids. In the embodiment illustrated, the angle is about seventy degrees with the horizontal.

After the discharge of the material by gravity flow from the chamber 11 the piston 42 is reciprocated downward within the chamber 11 until the end of the groove 50 reaches the valve 21 and the face 51 reaches the valve 47. Consequently it will displace substantially all of the high pressure atmosphere that existed in the chamber 11. Also, as that action takes place there is a purging of any loose materials left clinging to the walls of the chamber 11. Such purging is assisted by reason of the displacing of gas from the space within the groove 50 of the piston 42. Such displacement happens as the full diameter section 55 at the top of the piston 42 moves down to the valve 21. It may also be desireable to add some purging action by a controlled flow through the passage 52. That added purging would be done by manipulating the valve 53.

After the piston 42 has been fully extended the valve 47 will be closed once more and the valve 53 will also be closed. Next, the piston 42 will be withdrawn back up to the fully retracted position illustrated in FIG. 1, and the valve 21 will be opened by rotating the cylinder 24 back to the position indicated by the FIG. 2 illustration. Consequently the slot 32 will be in line with the bottom of the chute 19 once more and will be open into the chamber 11. This permits a next charge of the powdered coal or other finely divided solids to flow through the slot 32 and fill the chamber 11 so that another cycle may be commenced, like that just described.

It will be noted that the action of this feeder has the benefits of low friction and so anti-wear action, by reason of gravity filling of the chamber 11. In addition, the action of valve closing of the valve 21 which is by axial rotation of its cylindrical shape, minimizes any shearing type frictional action against the powdered coal in the chamber 11. Similarly, when the charge of coal is discharged from the chamber 11 following the pressurization, the powdered coal may again fall out by gravity flow with substantially no frictional wear. And, when the high pressure atmosphere within the chamber 11 is displaced by the piston 42, there is the afore described purging action which is combined with little if any frictional wear created by the pushing out of remaining loose particles of the charge. Thus, it will be noted that the structure of a feeder according to this invention has basically simple structural elements, and it operates with the advantages of minimal frictional wear as the charges are introduced during the cycling operations.

While a particular embodiment of the invention has been described above in considerable detail in accordance with the applicable statures, this is not to be taken as in any way limiting the invention but merely as being descriptive thereof.

I claim:

1. A dry feeder for finely divided solids into a high pressure atmosphere, comprising
   a cylindrical load chamber for receiving a charge of said solids,
   chute means for delivering said solids by gravity flow at atmospheric pressure to said load chamber,
   first valve means for controlling said atmospheric pressure delivery including seal means to withstand said high pressure,
   means for pressurizing said load chamber,
   means for orienting said load chamber for permitting gravity flow discharge into said high pressure atmosphere,
   second valve means for controlling said high pressure gravity discharge, and
   an elongated piston for displacing said high pressure atmosphere from said load chamber after said high pressure gravity discharge.

2. A dry feeder according to claim 1, wherein said first valve means comprises a cylinder having a lateral slot therethrough for connecting said chute means to said load chamber, said seal means being located at the ends of said cylinder.

3. A dry feeder according to claim 2, wherein said first valve means cylinder is mounted with its axis parallel to the axis of said cylindrical load chamber.

4. A dry feeder according to claim 3, wherein said elongated piston has a groove to accommodate said first valve means cylinder.

5. A dry feeder according to claim 4, further comprising second seal means on said elongated piston for maintaining said load chamber pressure.

6. A dry feeder for powdered coal and the like into a high pressure atmosphere, comprising in combination
   a cylindrical chamber for holding a charge of said powdered coal,
   means for mounting said chamber at an angle greater than the angle of repose of said charge for biasing said charge toward one end of said chamber,
   first valve means at said one end of said chamber to control discharge therefrom into said high pressure atmosphere,
   a receptacle for holding a supply of said powdered coal,
   means for connecting said receptacle with said chamber,
   said connecting means having an angle greater than the angle of repose of said powdered coal for permitting gravity feed from said receptacle into said chamber,
   second valve means associated with said connecting means for controlling said gravity feed,
   said second valve means comprising
   a cylinder having the axis thereof parallel with the axis of said chamber,
   a transverse passage through said cylinder, and
   seal means for holding said high pressure in said chamber when said cylinder is rotated ninety degrees,
   means for pressurizing said chamber to equalize said high pressure atmosphere, and
   means for displacing said high pressure atmosphere from said chamber after discharge of said powdered coal therefrom.

7. A dry feeder according to claim 6, wherein said means for displacing high pressure comprises a piston.

8. A dry feeder according to claim 7, wherein said piston has a groove to accommodate said second valve means.

9. A dry feeder for powdered coal and the like into a high pressure atmosphere, comprising in combination a cylindrical chamber for holding a charge of said powdered coal, means for mounting said chamber with its axis at an angle of about seventy degrees from horizontal for biasing said charge toward the lower end thereof, first valve means at said lower end of said chamber to control discharge therefrom into said high pressure atmosphere, a receptacle for holding a supply of said powdered coal, means for connecting said receptacle with said chamber at an angle of about seventy degrees from horizontal for permitting gravity feed from said receptacle to said chamber, second valve means comprising a solid cylinder mounted in the wall of said chamber with the axis of the cylinder parallel to the axis of the chamber, a transverse slot through said cylinder with the axis of said slot at about forty degrees from the axis of said cylinder, and means for sealing said cylinder mounting for holding said high pressure when said cylinder is rotated ninety degrees, means for pressurizing said chamber to equalize said high pressure atmosphere, and a piston reciprocally movable in said chamber for displacing said high pressure atmosphere from said chamber after discharge of said powdered coal, said piston having a longitudinal groove thereon to accommodate said second valve means within said chamber.

10. A dry feeder for finely divided solids into a high pressure atmosphere, comprising a cylindrical load chamber having a discharge end for said finely divided solids, means for orienting the axis of said chamber at an angle greater than the angle of repose of said finely divided solids toward said discharge end, chute means for delivering said solids by gravity flow at atmospheric pressure to said load chamber at one side thereof, first valve means for controlling said delivery to said load chamber from said chute means, comprising a cylinder mounted with its axis parallel to the axis of said load chamber, a lateral slot through said cylinder for connecting said chute means with said load chamber, and seal means at the ends and sides of said cylinder for withstanding said high pressure when said valve means is closed, means for pressurizing said load chamber, second valve means associated with said discharge end of said load chamber for controlling discharge after said chamber is pressurized, an elongated piston coaxial with said load chamber for displacing said high pressure atmosphere from said load chamber after said pressurized load chamber has discharged through said second valve means, a longitudinal groove on said piston for accommodating said first valve means cylinder, and second seal means on said piston for maintaining said high pressure in said load chamber.

* * * * *